United States Patent
Liu et al.

(10) Patent No.: US 10,986,653 B2
(45) Date of Patent: Apr. 20, 2021

(54) METHOD AND SYSTEM FOR SENDING AND RECEIVING DATA

(71) Applicant: China Academy of Telecommunications Technology, Beijing (CN)

(72) Inventors: Jiamin Liu, Beijing (CN); Bertrand Pierre, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 30 days.

(21) Appl. No.: 16/346,462

(22) PCT Filed: Nov. 10, 2017

(86) PCT No.: PCT/CN2017/105729
§ 371 (c)(1),
(2) Date: Apr. 30, 2019

(87) PCT Pub. No.: WO2018/082433
PCT Pub. Date: May 11, 2018

(65) Prior Publication Data
US 2019/0306871 A1    Oct. 3, 2019

(30) Foreign Application Priority Data

Nov. 3, 2016 (CN) .......................... 201610959950.6

(51) Int. Cl.
*H04W 72/12* (2009.01)
*H04W 28/06* (2009.01)
(Continued)

(52) U.S. Cl.
CPC .......... *H04W 72/1263* (2013.01); *H04L 1/18* (2013.01); *H04W 28/06* (2013.01);
(Continued)

(58) Field of Classification Search
CPC ............ H04W 72/1263; H04W 72/12; H04W 72/1242; H04W 80/02; H04W 28/06;
(Continued)

(56) References Cited

U.S. PATENT DOCUMENTS

2008/0310452 A1   12/2008   Vedantham et al.
2014/0140276 A1   5/2014    Cave et al.
(Continued)

FOREIGN PATENT DOCUMENTS

CN   101369879 A   2/2009
CN   101388900 A   3/2009
(Continued)

OTHER PUBLICATIONS

ZTE et al., "Consideration on the pre-concatenation in RLC for NR", 3GPP TSG-RAN WG2 Meeting #95bis, R2-166347, Kaohsiung, Oct. 10-14, 2016, 5 pages.
(Continued)

*Primary Examiner* — Habte Mered
(74) *Attorney, Agent, or Firm* — Kilpatrick Townsend & Stockton, LLP

(57) ABSTRACT

A method and system for sending and receiving data, for use in solving the problem that an RLC layer may process a data packet in a whole only when a transmission time arrives, which renders a long processing time in the entire process. In embodiments of the present invention, received PDCP PDUs are combined into RLC PDUs and are allocated with corresponding RLC SNs, wherein each RLC PDU corresponds to an RLC SN, and each RLC PDU comprises at least one PDCP PDU; data corresponding to scheduling resources is generated according to the generated RLC PDUs; the data corresponding to the scheduling resources is combined into an MAC PDU for data receiving. The solution in the
(Continued)

embodiments of the present invention may shorten the length of time in layer-2 data packet processing.

11 Claims, 6 Drawing Sheets

(51) Int. Cl.
*H04L 1/18* (2006.01)
*H04W 80/02* (2009.01)

(52) U.S. Cl.
CPC ......... *H04W 28/065* (2013.01); *H04W 72/12* (2013.01); *H04W 80/02* (2013.01)

(58) Field of Classification Search
CPC ...... H04W 28/065; H04W 28/04; H04L 1/18; H04L 1/1809; H04L 49/552
See application file for complete search history.

(56) References Cited

U.S. PATENT DOCUMENTS

| | | | |
|---|---|---|---|
| 2015/0312904 A1 | 10/2015 | Ma et al. | |
| 2016/0286402 A1 | 9/2016 | Hsu et al. | |
| 2018/0097918 A1* | 4/2018 | Nuggehalli | H04L 5/0091 |
| 2018/0124843 A1* | 5/2018 | Shaheen | H04W 80/02 |
| 2018/0219791 A1* | 8/2018 | Yu | H04L 69/324 |
| 2019/0174575 A1* | 6/2019 | Shah | H04L 1/1671 |
| 2019/0215901 A1* | 7/2019 | Jiang | H04L 5/0005 |
| 2019/0223251 A1* | 7/2019 | Jiang | H04L 69/08 |

FOREIGN PATENT DOCUMENTS

| | | |
|---|---|---|
| CN | 101848489 A | 9/2010 |
| CN | 101932004 A | 12/2010 |
| JP | 5579892 B2 | 8/2014 |
| KR | 20130113465 A | 10/2013 |
| KR | 20150093832 A | 8/2015 |
| WO | 2015179123 A1 | 11/2015 |

OTHER PUBLICATIONS

NTT DOCOMO INC, "Discussion on L2 protocol for NR", 3GPP TSG-RAN WG2 Meeting #95bis, R2-166544, Kaohsiung, Oct. 10-14, 2016, 3 pages.

Ericsson: "L2 Sequence Number in LTE", 3GPP Draft; R2-071837, 3$^{rd}$ Generation Partnership Project (3GPP), Mobile Competence Centre; 650, Route des Lucioles; F-06921 Sophia-Antipolis Cedex ; France, vol. RAN WG2, No. Kobe, Japan; May 4, 2007, May 4, 2007, XP050134734, the entire document, 4 pages.

MediaTek Inc.: "Segmentation and concatenation for NR UP", 3GPP TSG-RAN2 #95BIS meeting, R2-166990, Kaohsiung, Taiwan, Oct. 10-14, 2016.

* cited by examiner

METHOD AND SYSTEM FOR SENDING AND RECEIVING DATA

This application is a U.S. National Stage of International Application No. PCT/CN2017/105729, filed on Oct. 11, 2017, designating the United States, and claiming the benefit of Chinese Patent Application No. 201610959950.6, filed with the Chinese Patent Office on Nov. 3, 2016, and entitled "A method and system for transmitting data, and a method and system for receiving data", which is hereby incorporated by reference in its entirety.

FIELD

The present application relates to the field of wireless communications, and particularly to a method and system for transmitting data, and a method and system for receiving data.

BACKGROUND

Data are generally transmitted between a user Equipment (UE) and an evolved Node B (eNB) through a Packet Data Convergence Protocol (PDCP) layer, a Radio Link Control (RLC) layer, a Medium Access Control (MAC) layer, and a Physical (PHY) layer, each of which processes the data differently. The PDCP layer generally performs security operations, and header compression and decompression, e.g., encryption and integrity protection, Robust Header Compression (ROHC) and decompression, etc.; the RLC layer generally segments the data, concatenates data segments, delivers the data segments in sequence, guarantees transmission of Automatic Repeat reQuest (ARQ) data, etc.; the processing module generally schedules the data, concatenates different logical channels, performs Hybrid Automatic Repeat reQuest (HARQ) operations, etc.; and the PHY layer generally packages a transport block, transmits the packet via an air interface, etc. FIG. 1 is a schematic diagram of a user-plane protocol stack.

The PDCP layer generally functions to perform security-related operations (e.g., encryption and decryption, integrity protection and verification, etc.), and header compression and decompression, etc. The RLC layer generally functions to segment the data, to concatenate the data segments, to deliver the data segments in sequence, to perform ARQ operations, etc. The MAC layer generally functions to schedule PHY-layer resources in the uplink or the downlink.

In the solution above, the RLC layer will not process any integral data packet until the transmission time arrives, thus prolonging a period of time for processing the data.

SUMMARY

Embodiments of the application provide a method and system for transmitting data, and a method and system for receiving data so as to address the problem in the prior art that the RLC layer will not process any integral data packet until a transmission instance of time arrives, thus prolonging a period of time for processing the data.

An embodiment of the application provides a method for transmitting data, the method including: composing, by an allocating module, Radio Link Control Protocol Data Units (RLC PDUs) from received Packet Data Convergence Protocol Data Units (PDCP PDUs), and allocating corresponding Radio Link Control Sequence Numbers (RLC SNs) for the composed RLC PDUs, wherein each RLC PDU corresponds to one RLC SN, and each RLC PDU comprises at least one PDCP PDU; determining, by a determining module, data corresponding to a scheduled resource from the composed RLC PDUs according to the size of the scheduled resource; and composing, by a processing module, MAC PDUs from the data corresponding to the scheduled resource, and transmitting the MAC PDUs.

Optionally allocating, by the allocating module, the corresponding RLC SNs for the composed RLC PDUs includes: allocating, by the allocating module, corresponding RLC SNs in the order in which respective PDCP PDUs at the same priority are received; or allocating, by the allocating module, corresponding RLC SNs in the order in which respective sets of PDCP PDUs at the same priority are received, wherein each set of PDCP PDUs includes at least one PDCP PDU.

Optionally the allocating module allocates RLC SNs preferentially for RLC PDUs composed from PDCP PDUs at a high priority.

Optionally each composed RLC PDU comprises at least one of the received PDCP PDUs, and an RLC SN allocated for the composed RLC PDU; or if the order of Packet Data Convergence Protocol Sequence Numbers (PDCP SNs) of the respective received PDCP PDUs is the same as the order of the allocated RLC SNs for the composed RLC PDUs, then each composed RLC PDU comprises at least one of the received PDCP PDUs.

Optionally allocating, by the allocating module, the corresponding RLC SNs for the composed RLC PDUs includes: composing, by the allocating module, the composed RLC PDUs from the received PDCP PDUs before the size of the scheduled resource is determined; or composing, by the allocating module, the composed RLC PDUs from the received PDCP PDUs after the size of the scheduled resource is determined.

Optionally determining, by the determining module, the data corresponding to the scheduled resource from the composed RLC PDUs according to the size of the scheduled resource includes: if the determining module determines according to the size of the scheduled resource that segmentation is to be performed, then determining a target RLC PDU to be segmented, according to the size of the scheduled resource, and segmenting the target RLC PDU to generate a new RLC PDU.

Optionally segmenting by the determining module, the target RLC PDU to generate the new RLC PDU includes: generating, by the determining module, the new RLC PDU according to segmentation information and data segmented from the target RLC PDU; wherein the segmentation information includes a part or all of the following information: an RLC SN of the target RLC PDU; start positional information of the data segmented from the target RLC PDU in the target RLC PDU; length information of the data segmented from the target RLC PDU; or an indicator indicating whether the data segmented from the target RLC PDU is the last data segment in the target RLC PDU.

Optionally composing, by the processing module, the MAC PDUs from the data corresponding to the scheduled data includes: ordering, by the processing module, RLC PDUs of the same logical channel according to their RLC SNs, and ordering RLC PDUs of different logical channels according to their priorities; and composing, by the processing module, the MAC PDUs from the ordered RLC PDUs.

Optionally composing, by the processing module, the MAC PDUs from the ordered RLC PDUs includes: composing, by the processing module, the MACP PDUs according to Logical Channel IDs (LCIDs) of the ordered RLC PDUs; wherein a MAC PDU includes LCIDs of respective RLC PDUs comprised in the MAC PDU; or a MAC PDU includes different LCIDs, and there is a common LCID for RLC PDUs corresponding to the same LCID.

Optionally each RLC PDU is an initially transmitted RLC PDU, and/or a retransmitted RLC PDU.

Optionally the allocating module, the determining module, and the processing module are located in the same entity; or two modules among the allocating module, the determining module, and the processing module are located in the same entity; or the allocating module, the determining module, and the processing module are located in different entities.

Optionally if the allocating module, the determining module, and the processing module are located in the same entity, then the entity is an eNB or a user equipment or a Distributed Unit (DU); or if two modules among the allocating module, the determining module, and the processing module are located in the same entity, then the allocating module is located in a Central Unit (CU), and the determining module and the processing module are located in a DU.

An embodiment of the application provides a method for receiving data, the method including: separating, by a receiving module, a received MAC PDU into a plurality of RLC PDUs; transmitting, by a transmitting module, received RLC PDUs to a parsing module; and parsing, by the parsing module, ordered and/or recombined RLC PDUs for PDCP PDUs upon determining that the RLC PDUs can be parsed, wherein each RLC PDU corresponds to one RLC SN, and each RLC PDU includes at least one PDCP PDU.

Optionally after the transmitting module transmits the received RLC PDUs to the parsing module, the method further includes: generating, by the parsing module, feedback information according to RLC SNs of the received RLC PDUs; wherein if there is a lost RLC PDU which is not segmented, then the feedback information includes an RLC SN of the lost RLC PDU; or if there is a lost RLC PDU segment, then the feedback information includes an RLC SN of an original RLC PDU comprising the lost RLC PDU segment, information indicating a start position of the lost RLC PDU segment in the original RLC PDU, and length information of the lost RLC PDU segment; or if there are consecutive RLC PDUs which are lost, and there is no segmented RLC PDU among the consecutive RLC PDUs, then the feedback information includes an RLC SN of the first RLC PDU among the consecutive RLC PDUs, and the number of lost RLC PDUs; or if there are consecutive RLC PDUs which are lost, and there is a segmented RLC PDU among the consecutive RLC PDUs, then the feedback information includes an RLC SN of the first RLC PDU among the consecutive RLC PDUs, information indicating the segmented RLC PDU, and the number of lost RLC PDUs, wherein the segmented RLC PDU is the first RLC PDU and/or the last RLC PDU among the consecutive RLC PDUs.

Optionally transmitting, by the transmitting module, the received RLC PDUs to the parsing module includes: transmitting, by the transmitting module, the received RLC PDUs directly to the parsing module; or ordering and/or recombining, by the transmitting module, the received RLC PDUs according to the RLC SNs of the received RLC PDUs, and then transmitting the ordered and/or recombined RLC PDUs to the parsing module.

Optionally the receiving module, the transmitting module, and the parsing module are located in the same entity; or two modules among the receiving module, the transmitting module, and the parsing module are located in the same entity; or the receiving module, the transmitting module, and the parsing module are located in different entities.

Optionally if the receiving module, the transmitting module, and the parsing module are located in the same entity, then the entity is an eNB or a user equipment or a DU; or if two modules among the receiving module, the transmitting module, and the parsing module are located in the same entity, then the parsing module is located in a CU, and the receiving module and the transmitting module are located in a DU.

An embodiment of the application provides a system for transmitting data, the system including: an allocating module configured to compose RLC PDUs from received PDCP PDUs, and to allocate corresponding RLC SNs for the composed RLC PDUs, wherein each RLC PDU corresponds to one RLC SN, and each RLC PDU includes at least one PDCP PDU; a determining module configured to determine data corresponding to a scheduled resource from the composed RLC PDUs according to the size of the scheduled resource; and a processing module configured to compose MAC PDUs from the data corresponding to the scheduled resource, and to transmit the MAC PDUs.

Optionally the allocating module is configured: to allocate corresponding RLC SNs in the order in which respective PDCP PDUs at the same priority are received; or to allocate corresponding RLC SNs in the order in which respective sets of PDCP PDUs at the same priority are received, wherein each set of PDCP PDUs includes at least one PDCP PDU.

Optionally the allocating module is configured: to allocate RLC SNs preferentially for RLC PDUs composed from PDCP PDUs at a high priority.

Optionally each composed RLC PDU includes at least one of the received PDCP PDUs, and an RLC SN allocated for the composed RLC PDU; or if the order of PDCP SNs of the respective received PDCP PDUs is the same as the order of the allocated RLC SNs for the composed RLC PDUs, then each composed RLC PDU includes at least one of the received PDCP PDUs.

Optionally the allocating module is configured: to compose the composed RLC PDUs from the received PDCP PDUs before the size of the scheduled resource is determined; or to compose the composed RLC PDUs from the received PDCP PDUs after the size of the scheduled resource is determined.

Optionally the determining module is configured: if it is determined according to the size of the scheduled resource that segmentation is to be performed, to determine a target RLC PDU to be segmented, according to the size of the scheduled resource, and to segment the target RLC PDU to generate a new RLC PDU.

Optionally the determining module is configured: to generate the new RLC PDU according to segmentation information and data segmented from the target RLC PDU; wherein the segmentation information includes a part or all of the following information: an RLC SN of the target RLC PDU; start positional information of the data segmented from the target RLC PDU in the target RLC PDU; length information of the data segmented from the target RLC PDU; or an indicator indicating whether the data segmented from the target RLC PDU is the last data segment in the target RLC PDU.

Optionally the processing module is configured: to order RLC PDUs of the same logical channel according to their RLC SNs, and to order RLC PDUs of different logical channels according to their priorities; and to compose the MAC PDUs from the ordered RLC PDUs.

Optionally the processing module is configured: to compose the MACP PDUs according to the LCIDs of the ordered RLC PDUs; wherein a MAC PDU includes LCIDs of the respective RLC PDUs comprised in the MAC PDU; or a MAC PDU includes different LCIDs, and there is a common LCID for RLC PDUs corresponding to the same LCID.

Optionally each RLC PDU is an initially transmitted RLC PDUs, and/or a retransmitted RLC PDU.

Optionally the allocating module, the determining module, and the processing module are located in the same entity; or two modules among the allocating module, the determining module, and the processing module are located in the same entity; or the allocating module, the determining module, and the processing module are located in different entities.

Optionally if the allocating module, the determining module, and the processing module are located in the same entity, then the entity is an eNB or a user equipment or a DU; or if two modules among the allocating module, the determining module, and the processing module are located in the same entity, then the allocating module is located in a CU, and the determining module and the processing module are located in a DU.

An embodiment of the application provides a system for receiving data, the system including: a receiving module is configured to separate a received MAC PDU into a plurality of RLC PDUs; a transmitting module is configured to transmit received RLC PDUs to a parsing module; and the parsing module is configured to parse ordered and/or recombined RLC PDUs for PDCP PDUs upon determining that the RLC PDUs can be parsed, wherein each RLC PDU corresponds to one RLC SN, and each RLC PDU includes at least one PDCP PDU.

Optionally the parsing module is further configured: to generate feedback information according to RLC SNs of the received RLC PDUs; where if there is a lost RLC PDU which is not segmented, then the feedback information includes an RLC SN of the lost RLC PDU; or if there is a lost RLC PDU segment, then the feedback information includes an RLC SN of an original RLC PDU comprising the lost RLC PDU segment, information indicating a start position of the lost RLC PDU segment in the original RLC PDU, and length information of the lost RLC PDU segment; or if there are consecutive RLC PDUs which are lost, and there is no segmented RLC PDU among the consecutive RLC PDUs, then the feedback information includes an RLC SN of the first RLC PDU among the consecutive RLC PDUs, and the number of lost RLC PDUs; or if there are consecutive RLC PDUs which are lost, and there is a segmented RLC PDU among the consecutive RLC PDUs, then the feedback information includes an RLC SN of the first RLC PDU among the consecutive RLC PDUs, information indicating the segmented RLC PDU, and the number of lost RLC PDUs, wherein the segmented RLC PDU is the first RLC PDU and/or the last RLC PDU among the consecutive RLC PDUs.

Optionally the transmitting module is configured: to transmit the received RLC PDUs directly to the parsing module; or to order and/or recombine the received RLC PDUs according to the RLC SNs of the received RLC PDUs, and then transmit the ordered and/or recombined RLC PDUs to the parsing module.

Optionally the receiving module, the transmitting module, and the parsing module are located in the same entity; or two modules among the receiving module, the transmitting module, and the parsing module are located in the same entity; or the receiving module, the transmitting module, and the parsing module are located in different entities.

Optionally if the receiving module, the transmitting module, and the parsing module are located in the same entity, then the entity is an eNB or a user equipment or a DU; or if two modules among the receiving module, the transmitting module, and the parsing module are located in the same entity, then the parsing module is located in a CU, and the receiving module and the transmitting module are located in a DU.

An embodiment of the application provides a transmitting device including: a processor configured to read and execute program in a memory: to compose RLC PDUs from received PDCP PDUs, and to allocate corresponding RLC SNs for the composed RLC PDUs, wherein each RLC PDU corresponds to one RLC SN, and each RLC PDU includes at least one PDCP PDU; to determine data corresponding to a scheduled resource from the composed RLC PDUs according to the size of the scheduled resource; and to compose MAC PDUs from the data corresponding to the scheduled resource, and to transmit the MAC PDUs; and a transceiver configured to receive and transmit data under the control of the processor.

An embodiment of the application provides a receiving device including: a processor configured to read and execute program in a memory: to separate a received MAC PDU into a plurality of RLC PDUs; to transmit received RLC PDUs to a parsing module; and to parse ordered and/or recombined RLC PDUs for PDCP PDUs upon determining that the RLC PDUs can be parsed, wherein each RLC PDU corresponds to one RLC SN, and each RLC PDU includes at least one PDCP PDU; and a transceiver configured to receive and transmit data under the control of the processor.

In the embodiments of the application, RLC PDUs are composed from received PDCP PDUs, and corresponding RLC SNs are allocated for the composed RLC PDUs, where each RLC PDU corresponds to one RLC SN, and each RLC PDU includes at least one PDCP PDU; data corresponding to a scheduled resource are determined from the composed RLC PDUs according to the size of the scheduled resource; and MAC PDUs are composed from the data corresponding to the scheduled resource and transmitted. In the embodiments of the application, a binding relationship is created between the PDCP PDUs and the RLC PDUs, and each RLC PDU includes at least one PDCP PDU, so that the allocating module can generate the RLC PDUs upon reception of a part of the PDCP PDUs to thereby shorten the length of time for processing layer-2 data packets.

BRIEF DESCRIPTION OF THE DRAWINGS

In order to make the technical solutions according to the embodiments of the application more apparent, the drawings to which reference is made to in the description of the embodiments will be introduced below in brief, and apparently the drawings to be described below are only some embodiments of the application, and those ordinarily skilled in the art can further derive other drawings from these drawings without any inventive effort.

DETAILED DESCRIPTION OF THE EMBODIMENTS

In order to make the objects, the technical solutions, and the advantages of the application more apparent, the application will be described below in further details with reference to the drawings. Apparently the embodiments to be described are only a part but not all of the embodiments of the application. Based upon the embodiments of the application, all the other embodiments which can occur to those ordinarily skilled in the art without any inventive effort shall fall into the claimed scope of the application.

Figure 1:
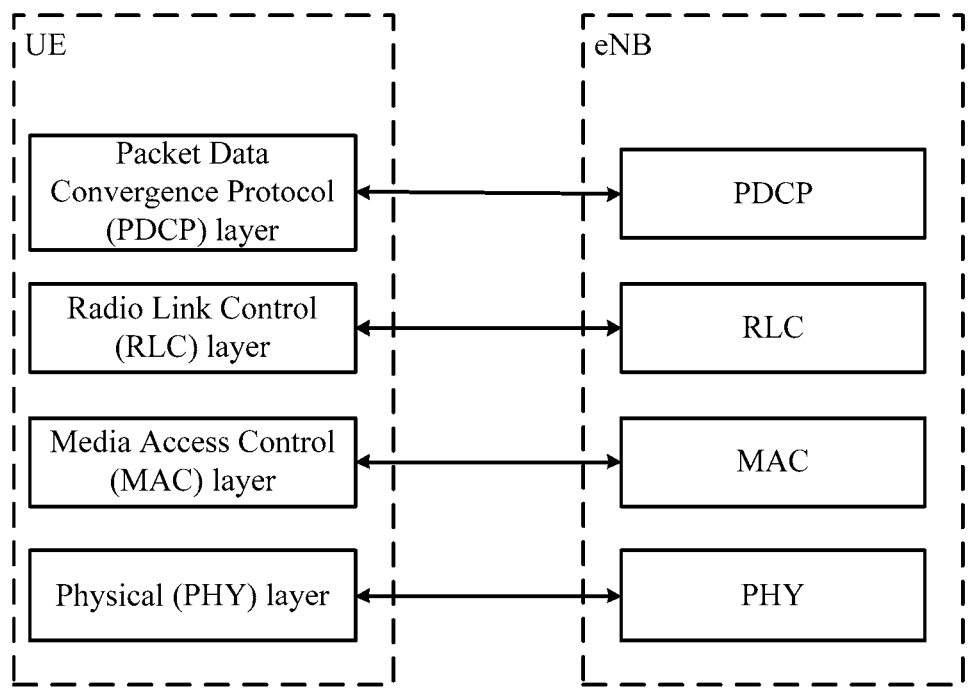
FIG. 1 is a schematic diagram of a user-plane protocol stack in the prior art.
Figure 2:
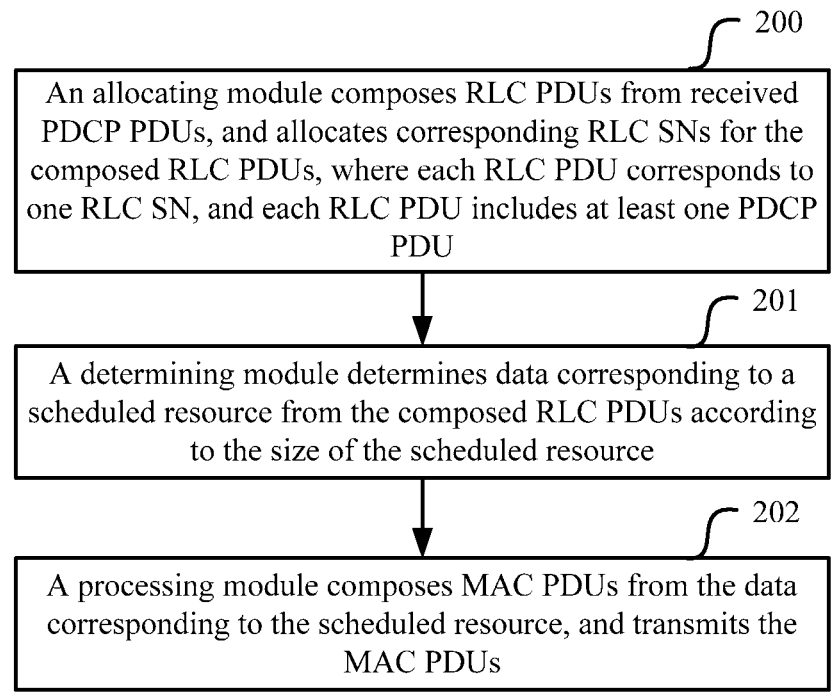
FIG. 2 is a schematic flow chart of a method for transmitting data according to an embodiment of the application.

As illustrated in FIG. 2, a method for transmitting data according to an embodiment of the application includes the following steps.

In the step 200, an allocating module composes RLC PDUs from received PDCP PDUs, and allocates corresponding RLC SNs for the composed RLC PDUs, where each RLC PDU corresponds to one RLC SN, and each RLC PDU includes at least one PDCP PDU.

In the step 201, a determining module determines data corresponding to a scheduled resource from the composed RLC PDUs according to the size of the scheduled resource.

In the step 202, a processing module composes MAC PDUs from the data corresponding to the scheduled resource, and transmits the MAC PDUs.

In the embodiments of the application, RLC PDUs are composed from received PDCP PDUs, and corresponding RLC SNs are allocated for the composed RLC PDUs, where each RLC PDU corresponds to one RLC SN, and each RLC PDU includes at least one PDCP PDU; data corresponding to a scheduled resource are determined from the composed RLC PDUs according to the size of the scheduled resource; and MAC PDUs are composed from the data corresponding to the scheduled resource and transmitted. In the embodiments of the application, a binding relationship is created between the PDCP PDUs and the RLC PDUs, and each RLC PDU includes at least one PDCP PDU, so that the allocating module can generate the RLC PDUs upon reception of a part of the PDCP PDUs to thereby shorten the length of time for processing layer-2 data packets.

In an implementation, the number of PDCP PDUs in each RLC PDU can be configured by a higher layer (for example, the number of PDCP PDUs in each RLC PDU, or the largest number of bytes in each RLC PDU can be configured), that is, configured statically; or can be configured dynamically by the allocating module according to a dynamic link condition and/or load condition (for example, the number of PDCP PDUs in each RLC PDU, or the largest number of bytes in each RLC PDU can be configured).

For example, when there are a good link condition and a low load, a larger number of PDCP PDUs in each RLC PDU can be set, and when there is a poor link condition or a high load, a smaller number of PDCP PDUs in each RLC PDU can be set.

If the allocating module, the determining module, and the processing module are not located in the same entity, then since the link condition and the load condition are statistically determined by the determining module, if the allocating module is located in a CU, and the determining module and the processing module are located in a DU, then the DU will feed the related conditions to the CU so that the determining module in the CU configures the number of PDCP PDUs in each RLC PDU. Moreover when a bearer of a UE is transmitted through a plurality of DUs, then since the states of the respective DUs may be different from each other, the allocating module in the CU may apply different dynamic configurations to the respective DUs according to different conditions of the respective DUs.

When a one-to-one mapping relationship between the RLC PDUs and the PDCP PDUs is configured, each PDCP PDU corresponds to one RLC PDU; and when an RLC PDU can include a plurality of PDCP PDUs, the number N of PDCP PDUs in an RLC PDU can be configured, and/or the size of an RLC PDU can be configured as M bytes, that is, no more than M bytes can be included in an RLC PDU.

If the number N of PDCP PDUs in an RLC PDU is configured, then an RLC PDU will be composed from N consecutive PDCP PDUs, and allocated with an RLC SN; and if the size of an RLC PDU is configured as M bytes, then an RLC PDU will be composed from several consecutive PDCP PDUs having no more than M bytes. Optionally the RLC PDU is composed from consecutive PDCP PDUs having maximum bytes, but the total size of the consecutive PDCP PDUs is no more than M.

In a particular implementation, when an RLC PDU includes a plurality of PDCP PDUs, the plurality of PDCP PDUs are located in the same RLC PDU, and correspond to the same RLC SN. Stated otherwise, several PDCP PDUs are combined in advance into an integral RLC PDU to be processed. In this implementation, the PDCP PDUs are small packets, that is, if the respective packets are processed separately, then both a header overhead and a processing overhead will be considerate, so they can be concatenated in advance into an RLC PDU with a moderate size to thereby lower the header overhead and the processing overhead.

RLC PDUs can be subsequently processed in the same way regardless of the number of PDCP PDUs in an RLC PDU.

In the embodiment of the application, after data packets arrive at the PDCP layer, a discard timer will be started for each data packet, and if the data packet has not been processed and transmitted after the timer expires, then it may be deleted directly; and the length of the timer can be Radio Resource Control (RRC)-configured, and the length thereof is related to the Quality of Service (QoS) of a service, and generally determined by the longest transmission delay tolerable to the service.

Generally the PDCP layer can buffer received higher-layer data, or can process the data immediately as follows: for each data packet from the higher layer, a Sequence Number (SN) is allocated in order, where the initial value of the SN is 0, that is, the SN allocated for the first Service Data Unit (SDU) is 0, the SN allocated for the second SDU is 1, and so on; a configured requirement is followed, and for example, if required header compression is configured, then a header compression process will be performed according to a configured header compression protocol; a security requirement is followed, and for example, integrity protection and security operations are performed on the data packet, and generally the integrity protection operation is only performed on control-plane data, and all the data including control-plane data and user-plane data are encrypted; a necessary PDCP header is added, where the PDCP header generally includes a PDCP SN, a PDCP PDU type indicator, etc.; and the data packet is transmitted to a corresponding RLC transmitting entity.

When the allocating module receives the data packets from the PDCP layers, i.e., the RLC SDUs, generally it firstly stores them into a transmission buffer, and forms RLC PDUs and transmits the RLC PDUs to the processing module on an appropriate occasion, so that they are processed at the MAC and PHY layers, and then transmitted via an air interface.

In the embodiment of the application, the allocating module, the determining module, and the processing module are located in the same entity; or two modules among the allocating module, the determining module, and the processing module are located in the same entity; or the allocating module, the allocating module, the determining module, and the processing module are located in different entities.

If the allocating module, the determining module, and the processing module are located in the same entity, then the entity will be an eNB or a UE or a DU; or if two modules among the allocating module, the determining module, and the processing module are located in the same entity, then the allocating module will be located in a CU, and the determining module and the processing module will be located in a DU.

I. For the sake of a convenient description, the inventive solution will be described below by way of an example in which all of three User-Plane (UP) entities including the allocating module, the determining module, and the processing module are located in the same physical entity, or connected over an ideal backhaul (with a transmission delay far below a millisecond order).

Implementations in which two modules among the allocating module, the determining module, and the processing module are located in the same entity or different entities, or the allocating module, the determining module, and the processing module are connected over a non-ideal backhaul will be described later.

The allocating module stores received PDCP PDU into a transmission buffer in order.

Optionally if there are different priority labels of these data packets, then data packets at different priorities will be buffered separately, that is, data packets at the same priority are buffered in a queue in the order in which they are received, and there are different queues of data packets at different priorities.

The allocating module allocates corresponding RLC SNs in the order in which respective PDCP PDUs at the same priority are received; or the allocating module allocates corresponding RLC SNs in the order in which respective sets of PDCP PDUs at the same priority are received, where each set of PDCP PDUs includes at least one PDCP PDU.

If there is a one-to-one correspondence relationship between the PDCP PDUs and the RLC PDUs, then the allocating module may allocate corresponding RLC SNs for the respective PDCP PDUs in the order of the PDCP PDUs, and for example, allocate 0 for the first PDCP PDU, 1 for the second PDCP PDU, and so on.

Here the SN of a PDCP PDU may be equal to the SN of an RLC PDU corresponding thereto, and for example, if there is a one-to-one correspondence relationship between the PDCP PDUs and the RLC PDUs, then the PDCP SNs 0, 1, 2, 3, 4, . . . will be the same as the RLC SNs 0, 1, 2, 3, 4, . . . , and at this time, the RLC SNs may be omitted, but the PDCP SNs may be reused directly as the RLC SNs to perform a related RLC operation, that is, if the order of the PDCP SNs of the respective received PDCP PDUs is the same as the order of the RLC SNs corresponding to the respective PDCP PDUs, then each composed RLC PDU will include at least one PDCP PDU.

Alternatively the PDCP SNs may be discrete, and for example, if a bearer is allocated to two paths for transmission, then the PDCP SNs of the PDCP PDUs received by an RLC transmitting entity may be PDCP SNs 0, 2, 4, 6, 9, . . . , mapped respectively in order to RLC SNs 0, 1, 2, 3, 4, . . . ; or a PDCP PDU may be deleted upon expiration, so the PDCP SNs may be discrete, and for example, the PDCP SNs of the PDCP PDUs received by an RLC entity may be PDCP SNs 0, 1, 2, 5, 6, 7, . . . , mapped respectively in order to RLC SNs 0, 1, 2, 3, 4, 5, . . . . If an RLC PDU includes a plurality of PDCP PDUs, for example, an RLC PDU includes two PDCP PDUs, then PDCP SNs 0 and 1 will be mapped to an RLC SN 0, PDCP SNs 2 and 3 will be mapped to an RLC SN 1, and so on. That is, each composed RLC PDU includes at least one PDCP PDU, and an RLC SN allocated for the PDCP PDU.

In an implementation, data packets shall be transmitted in order at the RLC layer, so the RLC SNs shall be allocated consecutively in order, and when this is satisfied by the PDCP SNs at the RLC layer, the PDCP SNs can be reused to thereby save a header overhead; and when all the PDCP SNs are not consecutive in order, consecutive SNs can be allocated separately at the RLC layer. A particular decision can be made based upon the RRC configuration, that is, whether there are RLC SNs is determined by the RRC configuration.

In the example above, there is a one-to-one correspondence relationship between the PDCP PDUs and the RLC PDUs, but there may be a one-to-multiple correspondence relationship between them in an implementation as long as this mapping relationship can be recorded in the allocating module, and for example, a fixed number N of PDCP PDUs are mapped to one RLC PDU, or PDCP PDUs of no more than M bytes can be mapped to one RLC PDU. For example, the allocating module can compose an RLC PDU from every two received PDCP PDUs; or can compose some RLC PDU from one PDCP PDU, some RLC PDU from two PDCP PDUs, some RLC PDU from three PDCP PDUs, etc.

Here the processing module transmits the size of a scheduled resource, e.g., N bytes, after scheduling the resource. In an implementation, when there is only one prioritized queue, the allocating module can allocate the RLC SNs one by one upon reception of the PDCP-layer data, and form the RLC PDUs (that is, the allocating module composes the RLC PDUs from the received PDCP PDUs before the size of the scheduled resource is determined); and when there are a plurality of prioritized queues, the allocating module can allocate the SNs in real time upon reception of the size of the scheduled resource (that is, the allocating module allocates corresponding RLC SNs preferentially for PDCP PDUs at a higher priority, and for example, if there is a higher priority of a prioritized queue A than a prioritized queue B, then corresponding RLC SNs will be allocated preferentially for the queue A), and form the RLC PDUs (that is, the allocating module composes the RLC PDUs from the received PDCP PDUs after the size of the scheduled resource is determined). High real-time processing efficiency is not required in the former implementation, and background processing can be performed in another optional implementation. When there are a plurality of different prioritized queues at the RLC layer, the RLC SDUs can be processed under some prioritization principle instead of the first-come-first-served, and at this time, the RLC SNs cannot be allocated, and the RLC PDUs cannot be composed, in advance, but after the processing module notifies the scheduled resource, those RLC PDUs to be transmitted are determined in an order of their priorities, and at this time, the RLC SNs can be allocated for the RLC SDUs, and the RLC PDUs can be composed from the RLC SDUs.

After the determining module determines the size of the scheduled resource (for example, the processing module at the MAC layer notifies the determining module of the size of the scheduled resource), the amount of data to be transmitted to the processing module can be determined in real time according to the size of the scheduled resource, and for example, if the size of the first RLC PDU is 200 bytes, the size of the second RLC PDU is 300 bytes, the size of the third RLC PDU is 500 bytes, and the size of the scheduled resource is 800 bytes, then both the first and second RLC PDUs (500 bytes in total) will be transmitted to the processing module, and the first 300 bytes in the third RLC PDU will be taken as a RLC PDU segment transmitted to the processing module.

Stated otherwise, if the determining module decides to segment an RLC PDU, according to the size of the scheduled resource, then it will determine a target RLC PDU to be segmented, according to the size of the scheduled resource, segment the target RLC PDU, and generate a new RLC PDU (which can be referred to as an RLC PDU segment).

Optionally the determining module generates the new RLC PDU according to segmentation information and data segmented from the target RLC PDU.

Here the segmentation information includes a part or all of the following information: the RLC SN of the target RLC PDU; start positional information of the data segmented from the target RLC PDU in the target RLC PDU; length information of the data segmented from the target RLC PDU; and an indicator indicating whether the data segmented from the target RLC PDU is the last data segment in the target RLC PDU.

For example, the format of the RLC PDU segment is as follows: optionally an RLC SN shall be carried, and for the same RLC PDU, different segments thereof shall carry the same SN, that is, they correspond to the original RLC PDU; optionally a start position, a Segment Offset (SO), of the RLC PDU segment in the original RLC PDU shall be carried, and for example, if the RLC PDU segment is the first segment, then the start position will be 0, and if the RLC PDU segment is bytes 300 to 500 in the RLC PDU, then the start position will be 300; optionally the RLC segment shall carry the length of the segment, and for example, if the RLC segment is a segment of bytes 0 to 200 in the original RLC PDU, then the length thereof will be 200 bytes, and the length filed is optional in a header field of the RLC segment because the length may be reflected when an MAC packet is generated; and optionally a Last Segment Flag (LSF) indicating whether the RLC PDU segment is the last segment shall be carried, for example, as a 1-bit explicit indicator, where 0 indicates that it is not the last segment, and 1 indicates that it is the last segment.

Here an RLC PDU in the embodiment of the application can be an initially transmitted RLC PDU and/or a retransmitted RLC PDU.

In an implementation, no matter whether an RLC PDU is retransmitted or initially transmitted, if the size of the scheduled resource is not sufficient to accommodate the entire RLC PDU, then the RLC PDU may be segmented according to the size of the scheduled resource to thereby improve the transmission efficiency and avoid a transmission resource from being wasted.

Here an RLC PDU segment may be retransmitted in the following two instances: retransmission of an RLC PDU is requested, but the transmission resource is not sufficient to accommodate the entire RLC PDU, so the RLC PDU shall be segmented according to the size of the resource; and retransmission of an RLC PDU segment is requested, but the transmission resource is not sufficient to accommodate the entire requested RLC PDU segment, so the RLC PDU shall be segmented again according to the size of the resource.

In either of the instances above, for an RLC PDU segment to be retransmitted, the retransmitted RLC PDU segment is similar to an initially transmitted segment, that is, the RLC SN indicates the RLC PDU including the segment, and SO, LI, and LSF indicate the position and the length of the segment in the original RLC PDU, and whether the segment is the last segment.

By way of an example, an RLC PDU segment to be retransmitted is positioned at bytes 500 to 1500 in an RLC PDU with an SN of 10, and the total length of the RLC PDU is 1500 bytes. The size of a resource on a first transmission occasion is 700 bytes, so the RLC PDU segment is segmented according to the size of the transmission resource, where the SN of the RLC PDU is 10, the SO thereof is 500, the LI thereof is 700, and the LSF thereof is 0 (the segment is not the last segment); and the size of a resource on a second transmission occasion is 300 bytes, so the RLC PDU segment is segmented according to the size of the transmission resource, where the SN of the RLC PDU is 10, the SO thereof is 1200, the LI thereof is 300, and the LSF thereof is 1 (the segment is the last segment).

For a receiver, since reception of the bytes 0 to 499 in the RLC PDU with the SN of 10 has been acknowledged, and reception of the remaining bytes thereof has been negatively acknowledged, it is determined that the entire RLC PDU with the SN of 10 has been received, upon reception of the two retransmissions in that the PDU has been received correctly because all the bytes thereof have been received in order until the last segment.

Optionally the processing module composes the MAC PDUs from the data corresponding to the scheduled resource in such a way that it orders RLC PDUs of the same logical channel according to their RLC SNs, orders RLC PDUs of different logical channels according to their priorities, and composes the MAC PDUs from the ordered RLC PDUs.

Here the MAC PDUs are composed under the following principle: RLC PDUs and RLC PDU segments from the same logical channel are combined together in an order of their SNs or priorities as many as possible; and for data of different logical channels, data of a logical channel at a high priority are placed in earlier bytes of an MAC PDU, and data of a logical channel at a low priority are placed in later bytes of the MAC PDU, as many as possible, that is, the data of the logical channels are placed in an order of their priorities.

Figure 3A:
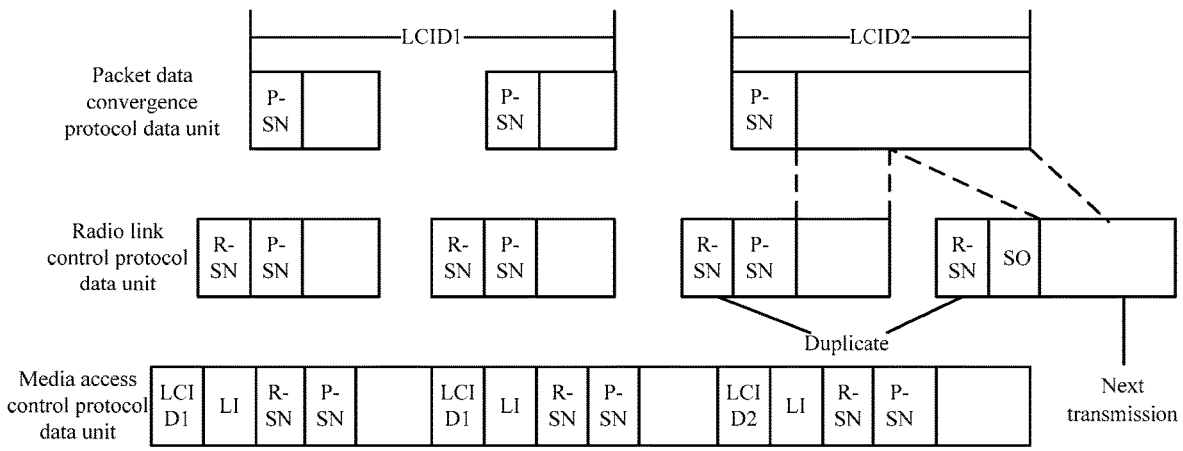
FIG. 3A is a schematic diagram of a first packaging scheme according to an embodiment of the application.

FIG. 3A illustrates a typical packaging process, where the P-SN represents a PDCP SN, the R-SN represents an RLC SN, the LCID represents a Logical Channel Identifier, and the LI represents a Length Indicating field. Since there is a higher priority data of the logical channel with the LCID1 than data of the logical channel with the LCID2, the data can be placed in earlier bytes of an MAC PDU, and RLC PDUs of the same logical channel are placed together as many as possible. Since data of the logical channel with the LCID2 are a segment, which is the first segment, so the Segment Offset (SO) is 0. Here there is another simplified scheme in which a 1-bit indicator indicates that this is a segment, which is the first segment; and for the second segment of the logical channel with the LCID2, an explicit SO indicator shall be carried.

For example, the first segment is transmitted over the logical channel with the LCID2 at an instant 1 of time, and since this segment starts with the initial position of the original RLC PDU with the SN of n, SO=0 can be carried to indicate that this is the first segment, or a special bit segment (First Segment (FS)), e.g., 1-bit information, can be carried, where the FS taking the value of 1 indicates that this is the first segment, and the FS taking the value of 0 indicates that this is not the first segment. When it is the first segment, since the carried FS=1 explicitly indicates that this is the first segment, SO=0 may be omitted at this time.

The second segment in the same RLC PDU with the SN of n, of the logical channel with the LCID2, shall be transmitted at the next transmission instant 2 of time, and at this time, it is not the first segment, so explicit SO shall be carried to indicate the start position of the second segment in the original RLC PDU.

In an implementation, the processing module composes the MACP PDUs according to the LCIDs of the ordered RLC PDUs.

Here a MAC PDU includes LCIDs of respective RLC PDUs comprised in the MAC PDU.

Figure 3B:
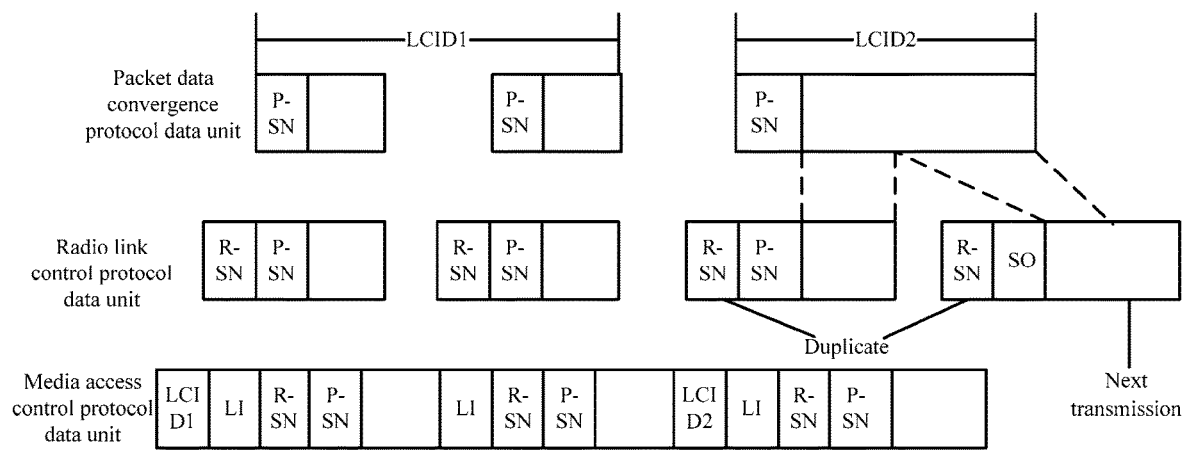
FIG. 3B is a schematic diagram of a second packaging scheme according to an embodiment of the application.

In another optional implementation, a MAC PDU includes different LCIDs, and there is a common LCID for RLC PDUs corresponding to the same LCID. Particularly in the example as illustrated in FIG. 3B, data packets with the same LCID are combined together, and carry the uniform LCID.

Figure 3C:
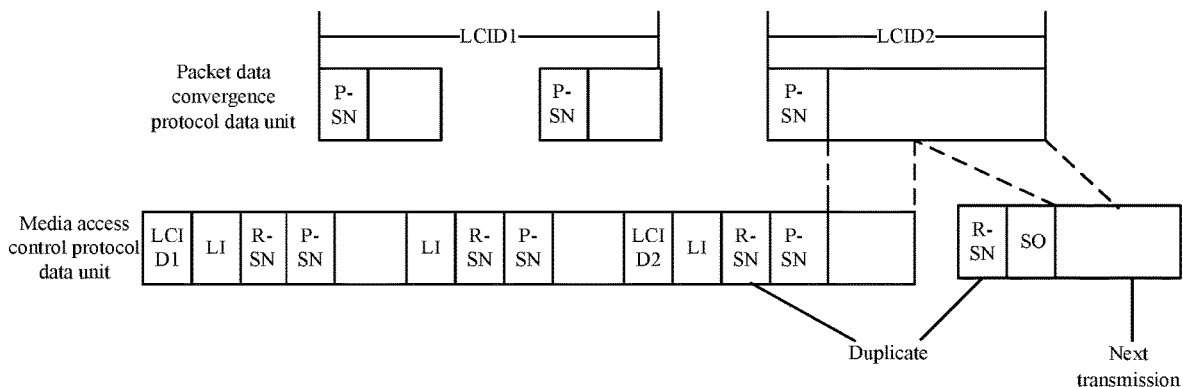
FIG. 3C is a schematic diagram of a third packaging scheme according to an embodiment of the application.

In the two examples above, the allocating module and the determining module are located at the RLC layer, and the processing module is located at the MAC layer. For the sake of further simplification, all of the allocating module, the determining module, and the processing module can be arranged at the MAC layer particularly as illustrated in FIG. 3C.

In an implementation, the processing module can process data processed by the determining module, and the determining module processes subsequent data concurrently to thereby save a processing period of time, and for example, the determining module can transmit processed MAC PDUs to the processing module for further processing, and also the determining module can further process subsequent MAC PDUs.

It shall be noted that in the description above, only some fields are illustrated in a header format of each layer, e.g., SN, LI, LCID, etc., but in a particular implementation, there may be also other fields in the header, e.g., a type indicator D/C indicating data or control, an E field which is an extension indicating field, LS indicating the last segment, etc., although a repeated description thereof will be omitted here.

II. Implementations in which two modules among the allocating module, the determining module, and the processing module are located in the same entity or different entities, or the allocating module, the determining module, and the processing module are connected over a non-ideal backhaul will be described below.

Here, for example, the allocating module is located in a CU, and the determining module and the processing module are located in a DU.

Figure 4A:
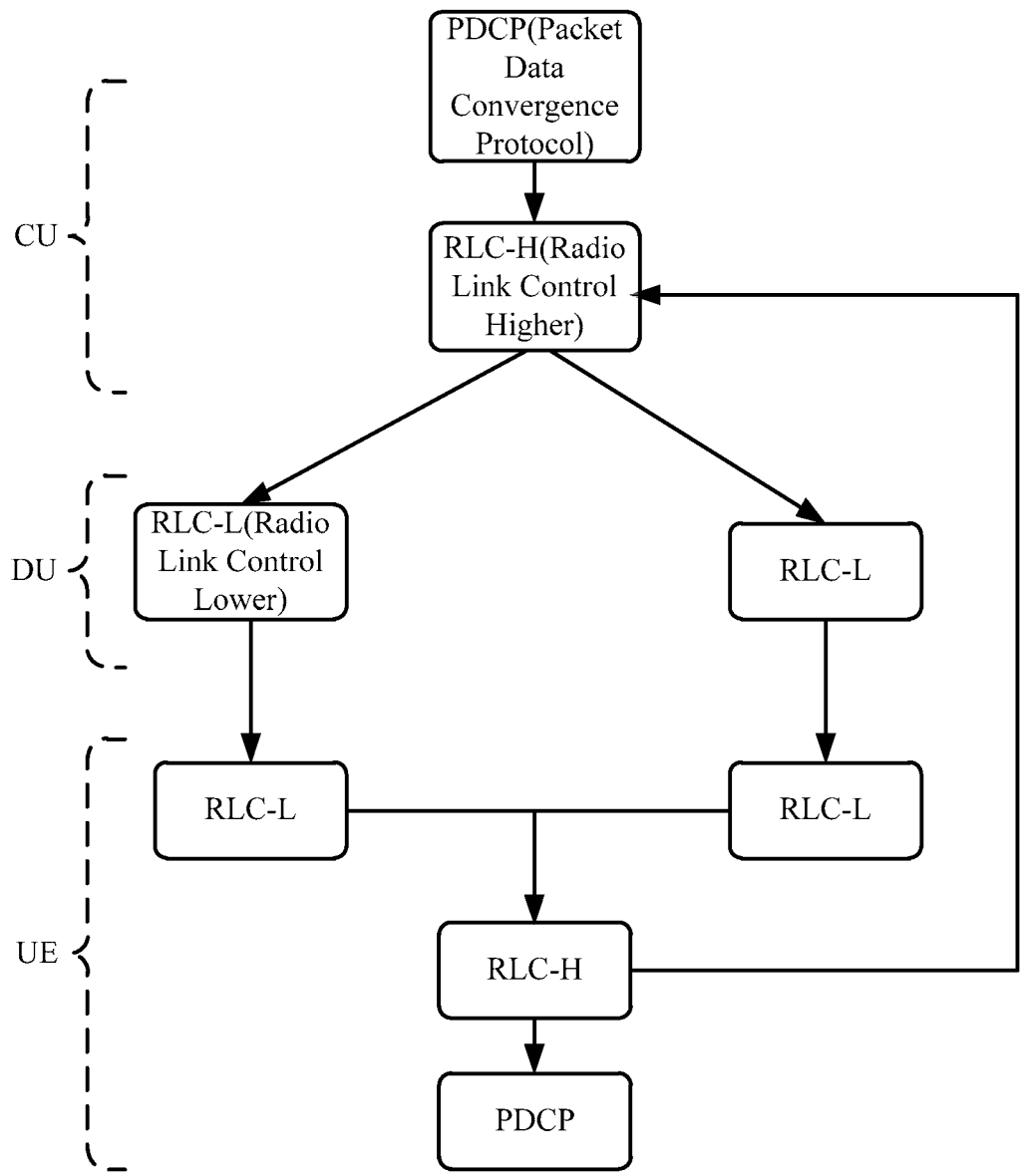
FIG. 4A is a schematic diagram of downlink data transmission when a CU is separate from a DU according to an embodiment of the application.

FIG. 4A illustrates typical processing of downlink data in a CU/DU entity.

Here the CU refers to a central processing entity, and the DU is a distributed processing entity.

The RLC-H refers to the allocating module, the RLC-L refers to the determining module, and they are located respectively two physical entities, i.e., a CU and a DU.

Downlink data are transmitted as follows.

1. The PDCP layer allocates PDCP SNs for higher-layer data, performs an security operation and header compression on the data, and adds headers to the data, to generate PDCP PDUs, and transmits them to a corresponding RLC-H entity.

2. The RLC-H entity allocates RLC SNs for received PDCP PDUs in order, where there is a one-to-one correspondence relationship between RLC PDUs and the PDCP PDUs, and distributes the data and the corresponding RLC SNs to one or more RLC-L entities.

Here a path with a better link condition and a lower load is selected according to flow control and feedback, or in order to satisfy a required short transmission delay and high reliability, the same data can be transmitted to a plurality of RLC-L entities at the same time.

3. The RLC-L entity or entities in a DU combines and transmits RLC PDUs and RLC PDU segments with an appropriate size to the MAC layer for subsequent transmission, according to the size of a transmission resource scheduled in real time by the MAC layer, where an RLC PDU segment carries the RLC SN allocated by the RLC-H entity, and SO, LI, LSF, and other indicating fields according to its original PDCP PDU.

In the embodiment of the application, the data are processed at the MAC/PHY layer, and then transmitted via an air interface, and further processed at the opposite PHY/MAC layer, delivered to the receiving RLC-L entity or entities, and converged onto the RLC-H entity, so that the RLC-H entity updates and feeds back a reception state, and recomposes and delivers the data packets to the PDCP layer. The PDCP layer supports out-of-order de-securing, header decompression, and other operations.

Optionally here the RLC-L entity or entities firstly recomposes or recompose the RLC PDUs, and then delivers or deliver them to the RLC-H entity, or the RLC-L entity or entities delivers or deliver the RLC PDU segments directly to the RLC-H entity, and finally the RLC-H entity recomposes and orders them. Generally when the same RLC PDUs are transmitted over respective paths, the RLC-H entity can recombine RLC PDU segments from the different paths to thereby speed up recombination and shorten a delay. Accordingly when the same data are transmitted over a plurality of paths, the function of recombining RLC PDU segments can be performed by the RLC-H entity; otherwise, this function can be performed by the RLC-L entity or entities, that is, the function can be performed flexibly.

Furthermore in the embodiment of the application, only a typical example of a user-plane protocol stack disturbed between a CU and a DU, but in fact, the method for processing data according to the embodiment of the application can also be performed similarly when only the PDCP entity is located in the CU, and both the RLC entity and the MAC entity are located in the DU, or the PDCP entity and a plurality of RLC-H entities are located in the CU, and both a plurality of RLC-L entities and the MAC entity are located in the DU, although a repeated description thereof will be omitted here.

Figure 5:
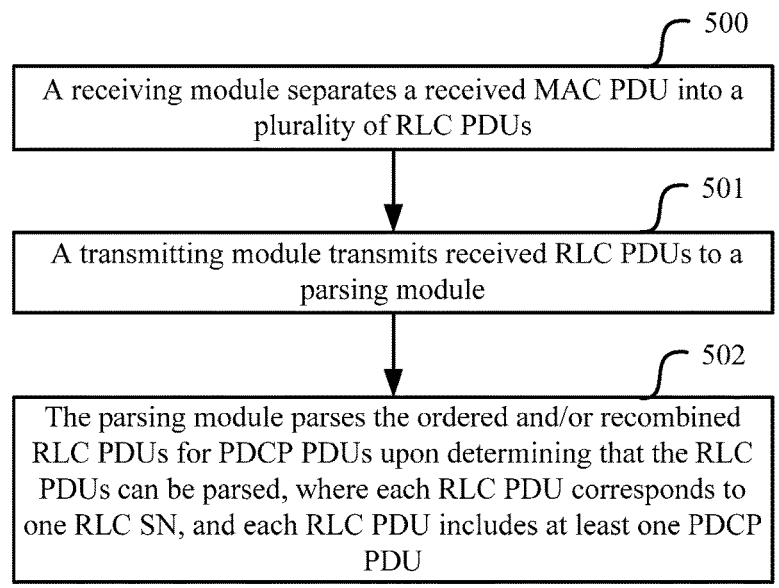
FIG. 5 is a schematic flow chart of a method for receiving data according to an embodiment of the application.

As illustrated in FIG. 5, a method for receiving data according to an embodiment of the application includes the following steps.

In the step 500, a receiving module separates a received MAC PDU into a plurality of RLC PDUs.

In the step 501, a transmitting module transmits received RLC PDUs to a parsing module.

In the step 502, the parsing module parses ordered and/or recombined RLC PDUs for PDCP PDUs upon determining that the RLC PDUs can be parsed, where each RLC PDU corresponds to one RLC SN, and each RLC PDU includes at least one PDCP PDU.

In the embodiment of the application, the receiving module, the transmitting module, and the parsing module are located in the same entity; or two modules among the receiving module, the transmitting module, and the parsing module are located in the same entity; or the receiving module, the transmitting module, and the parsing module are located in different entities.

If the receiving module, the transmitting module, and the parsing module are located are located in the same entity, then the entity will be an eNB or a UE or a DU.

If two modules among the receiving module, the transmitting module, and the parsing module are located in the same entity, then the parsing module will be located in a CU, and the receiving module and the transmitting module are located in a DU.

I. For the sake of a convenient description, the inventive solution will be described below by way of an example in which all of three User-Plane (UP) entities including the receiving module, the transmitting module, and the parsing module are located in the same physical entity, or connected over an ideal backhaul (with a transmission delay far below a millisecond order).

Implementations in which two modules among the receiving module, the transmitting module, and the parsing module are located in the same entity or different entities, or the allocating module, the determining module, and the processing module are connected over a non-ideal backhaul will be described later.

The receiver performs an inverse process of the transmitter. Upon reception of data from the physical layer via an air interface, the receiver processes the data at the physical layer, and then recovers the data into the format of an MAC PDU.

Upon reception of the data, the receiver parses the data for different data blocks according to LCID, LI, and other information carried therein, and determines RLC PDUs of different logical channels according to the indicating LCIDs (the RLC PDUs may also include an RLC PDU segment).

The transmitting module processes the RLC PDUs in the following two implementations upon reception of the RLC PDUs.

In a first implementation, the transmitting nodule transmits the received RLC PDUs directly to the parsing module.

In this implementation, upon reception of the RLC PDUs, the transmitting module delivers the RLC PDUs to the parsing module, and also an RLC PDU segment directly to the parsing module.

In fact, the first implementation is similar to a transparent-transmission implementation, that is, all of the received data are transmitted directly to a RLC Higher module (i.e., the parsing module) for processing, e.g., gap detection, a Treordering timer, ACK/NACK state feedback, etc.

In a second implementation, the transmitting module reorders and/or recombines and then transmits the received RLC PDUs to the parsing module according to RLC SNs of the received RLC PDUs.

The transmitting module reorders the received RLC PDUs, and recombines and then reorders RLC PDU segments to thereby avoid them from being out of order due to an MAC HARQ, and delivers them to the parsing module.

If there are discretely received RLC PDUs, then Treordering_timer will be started, and if no integral RLC PDUs have been received yet after Treordering_timer expires, then the RLC PDUs detected until Treordering_timer expires will be delivered to the parsing module, or will not be delivered to the parsing module until integral RLC PDUs are received.

Here the RLC PDUs are ordered by updating a reception state in an order of their RLC SNs, and for example: if the highest SN of the data currently received in order is 3, then the next SN to the highest SN will be 4, and if the SN of a newly received RLC PDU is 4, that is, the RLC PDU is received in order, then the next SN to the highest SN of the data received in order will be updated to 5 (of course, here only the highest SN may be recorded without recording the next SN to the highest SN); and if there is an SN gap occurring among the RLC SNs (for example, if the SN of a received RLC PDU is 3, and the next SN is 5, then an SN gap will be determined), then Treordering_timer may be started, and an out-of-order condition due to underlying transmission may be detected, and if no PDU has been received after Treordering_timer expires, then a wait will be aborted (in the Unacknowledged Mode (UM)), or the parsing module will feed back an NACK state report to request for retransmission (in the Acknowledged Mode (AM)).

Here after the transmitting module transmits the received RLC PDUs to the parsing module, the parsing module generates feedback information according to the RLC SNs of the received RLC PDUs. Thereafter the feedback information can be transmitted as in the method according to the embodiment of the application.

Different feedback information is made in different reception instances as described below respectively.

In a first instance, if there is no SN gap occurring, that is, the RLC PDUs are received successfully, then the feedback information will include Acknowledgement (ACK) information.

In a second instance, if there is an SN gap occurring, that is, there is a lost RLC PDU or PDUs, then the feedback information will include Negative Acknowledgement (NACK) information.

For the feedback information for an SN gap occurring, since RLC PDU data are allowed to be segmented according to the size of the transmission resource, the gap may occur because the entire RLC PDU is lost, or an RLC PDU segment is lost, or a series of consecutive RLC PDUs are lost.

The NACK state shall be reported while considering high efficiency and saving an overhead so that a lost RLC PDU is indicated explicitly with NACK_SN, a lost RLC PDU segment is indicated explicitly with NACK_SN carrying SO and LI, and a plurality of lost RLC PDUs with consecutive SNs are indicated explicitly with the first NACK_SN carrying the number of consecutive PDUs which are lost. Only the NACKed RLC PDUs shall be indicated one by one, and there will be only one ACK_SN to indicate that all of the other PDUs with the ACK_SN than the PDUs or PDU segments indicated explicitly with NACK are received correctly.

The feedback information for an SN gap occurring will be described below.

1. If there is a lost RLC PDU which is not segmented, then the feedback information will include the RLC SN of the lost RLC PDU.

For example, if the SN of a received RLC PDU is 3, and the SN of the next received RLC PDU is 5, then it will be determined that an RLC PDU with the SN of 4 is lost, and 4 may be added to the feedback information.

2. If there is a lost RLC PDU segment, then the feedback information will include the RLC SN of the original RLC PDU including the lost RLC PDU segment, information indicating the start position of the lost RLC PDU segment in the original RLC PDU, and length information of the lost RLC PDU segment.

For example, the SN of a received RLC PDU segment is 3, the SN of the next received RLC PDU is 4, and the RLC PDU with the SN of 3 can be determined as a segmented RLC PDU, and the particular segment which is not received can be determined, according to the received RLC PDU segment with the SN of 3; and for example, if the first segment is not received, and the length of the lost RLC PDU segment is 200 bytes, then the feedback information will include SN=3, and Length=200, and also SO=0 indicating the start position of the lost RLC PDU segment in the original RLC PDU, or FS=1 indicating the first segment. Optionally the length can be indicated in the Length Indicator, or can be represented as the end position of the segment in the original RLC PDU.

3. If there are consecutive RLC PDUs which are lost, and there is no segmented RLC PDU among the consecutive RLC PDUs, then the feedback information will include the RLC SN of the first RLC PDU among the consecutive RLC PDUs, and the number of lost RLC PDUs.

For example, if the SN of a received RLC PDU is 3, and the SN of the next received RLC PDU is 7, then it will be determined that RLC PDUs with the SNs of 4, 5, and 6 are lost, so the feedback information includes 4 (i.e., the RLC SN of the first RLC PDU) and 3 (i.e., the number of lost RLC PDUs).

4. If there are consecutive RLC PDUs which are lost, and there is a segmented RLC PDU among the consecutive RLC PDUs, then the feedback information will include the RLC SN of the first RLC PDU among the consecutive RLC PDUs, information indicating the segmented RLC PDU, and the number of lost RLC PDUs, where the segmented RLC PDU is the first RLC PDU and/or the last RLC PDU among the consecutive RLC PDUs.

For example, if a part of an original RLC PDU with the SN of 4 is received, and the SN of the next received RLC PDU is 7, then it will be determined that RLC PDUs with the SNs of 4, 5, and 6 are lost. If the RLC PDU with the SN of 4 among the RLC PDUs with the SNs of 4, 5, and 6 is a segmented RLC PDU, then the feedback information will include 4 (i.e., the RLC SN of the first RLC PDU), 3 (i.e., the number of lost RLC PDUs), and information indicating the segmented RLC PDU (e.g., 00 indicates the first RLC PDU is segmented, 01 indicates the last RLC PDU is segmented, and 11 indicates the first and last RLC PDUs are segmented).

The receiver makes feedback only according to a reception state, and if the entire RLC PDU is not received (even if the RLC PDU is segmented), then the SN may characterize the entire lost RLC PDU; and if a part of segments of the RLC PDU are received, then a state report will carry segment information of the lost RLC PDU segments.

Here if information about consecutive RLC PDUs which are lost is to be fed back, then there will be no segmented RLC PDU among the consecutive RLC PDUs which are lost, or the first RLC PDU and/or the last RLC PDU will be a segmented PDU; and if there is a segmented RLC PDU among the consecutive RLC PDUs which are lost, and the segmented RLC PDU is not the first RLC PDU or the last RLC PDU, then the first and second implementations may be applied, that is, the RLC PDUs which are not segmented, and the segmented RLC PDU are fed back separately, or the RLC PDUs satisfying the requirement may be fed back consecutively, and the other RLC PDUs will be fed back separately.

For example, if RLC PDUs with the SNs of 3 to 8 are lost, where the RLC PDU with the SN of 7 is a segmented RLC PDU, then the RLC PDUs with the SNs of 3 to 6 may be fed back consecutively, and the RLC PDUs with the SNs of 7 and 8 may be fed back separately; or the RLC PDUs with the SNs of 3 to 6 may be fed back consecutively, and the RLC PDUs with the SNs of 7 and 8 may be fed back consecutively.

In an implementation, when the entire RLC PDU is received in a reception window, even if it is not an RLC PDU received in order, then the parsing module may parse the RLC PDU for PDCP PDUs, and transmit the PDCP PDUs to the PDCP layer, which performs decryption, integrity de-protection, header decompression, etc., thereon in advance.

Upon reception of the PDCP PDUs transmitted from the RLC layer, the PDCP layer determines whether they are normal data packets in the reception window, whether they are duplicate, etc., performs de-encryption, integrity de-protection, header decompression, and other operations on packets satisfying the reception condition, and thereafter reorders the data packets, and if they satisfy a delivery-in-order requirement, then the PDCP layer may deliver them to the higher layer; otherwise, the PDCP layer will wait to reorder them, and deliver all of them to the higher layer in order after data at a gap are subsequently supplemented.

II. Implementations in which two modules among the receiving module, the transmitting module, and the parsing module are located in the same entity or different entities, or the receiving module, the transmitting module, and the parsing module are connected over a non-ideal backhaul will be described below.

Figure 4B:
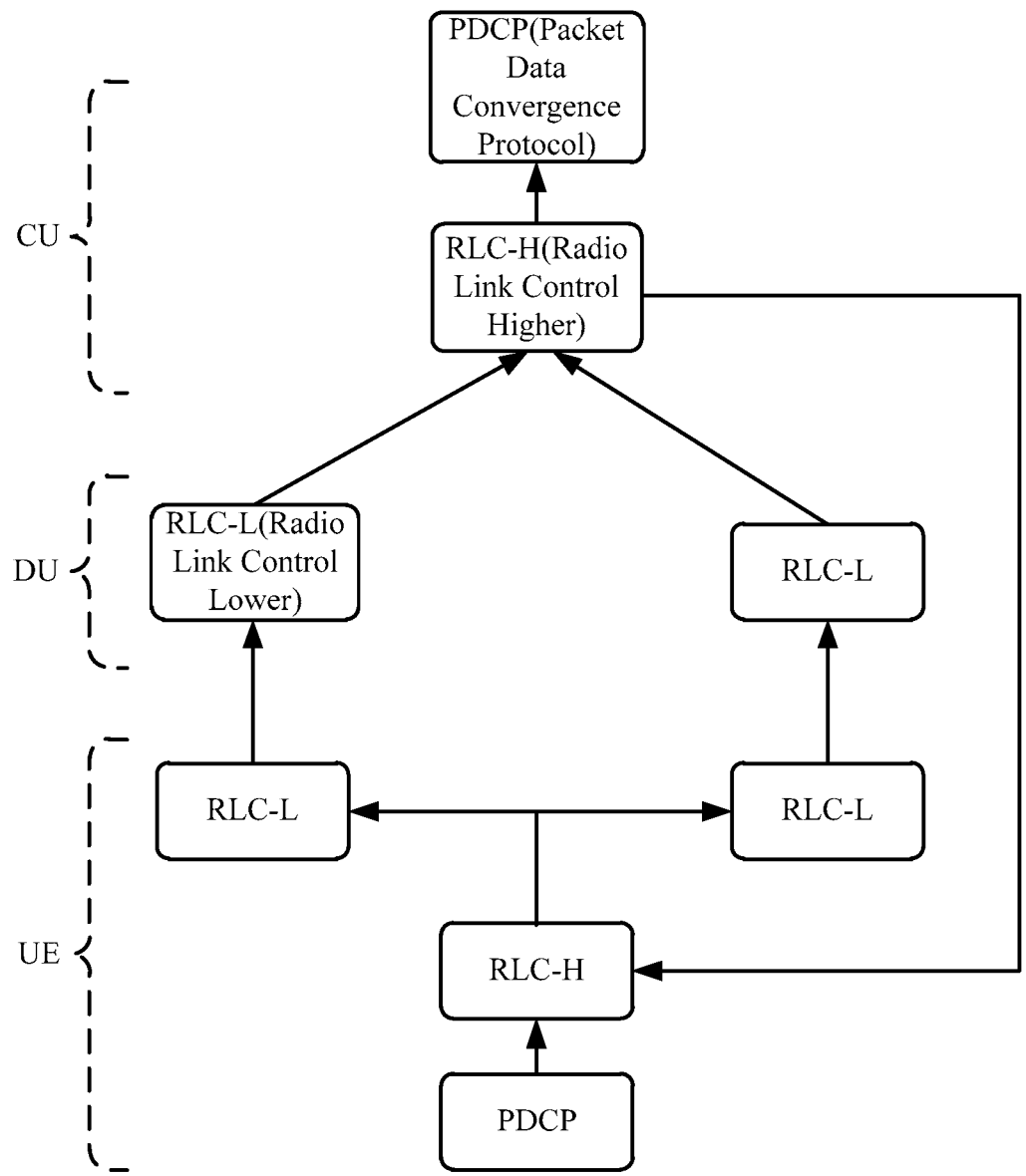
FIG. 4B is a schematic diagram of uplink data transmission when a CU is separate from a DU according to an embodiment of the application.

FIG. 4B illustrates typical processing of uplink data in a CU/DU entity.

Here, for example, the parsing module is located in a CU, and the transmitting module and the receiving module are located in a DU.

1. Upon reception of MAC PDU data, the MAC layer (i.e., the receiving module) in the DU parses the data for RLC PDUs or RLC PDU segments of different logical channels, and transmits them to an RLC lower module (i.e., the transmitting module) in the DU.

2. The RLC Lower module may not process them, but deliver them directly to an RLC Higher module (i.e., the parsing module) in the CU, or the RLC Lower module may reorder and recombine, and then deliver them to the RLC Higher module.

3. The RLC Higher module performs reordering and necessary recombination, and other operations on the RLC PDUs or the RLC PDU segments, and feeds backs a state report as specified; and the RLC Higher module transmits PDCP PDUs obtained as a result of parsing to the PDCP layer.

4. The PDCP layer performs decryption, integrity de-protection, header decompression, and other operations thereon, and then reorders them in the AM mode, and delivers them to a higher layer in order.

As can be apparent from the description above, in the embodiment of the application, the respective layers can further process processed layer-2 data of each other to thereby improve the real-time efficiency of processing, and there are a uniform format and processing flow of initially transmitted and retransmitted segments to thereby lower the complexity of processing, and improve the efficiency of layer-2 processing of a large number of data packets so as to be more applicable to various future 5G application scenarios.

Based upon the same inventive idea, an embodiment of the application further provides a system for transmitting data, and since the system addresses the problem under a similar principle to the method for transmitting data according to the embodiment of the application, reference can be made to the implementation of the method for an implementation of the system, and a repeated description thereof will be omitted here.

Figure 6:
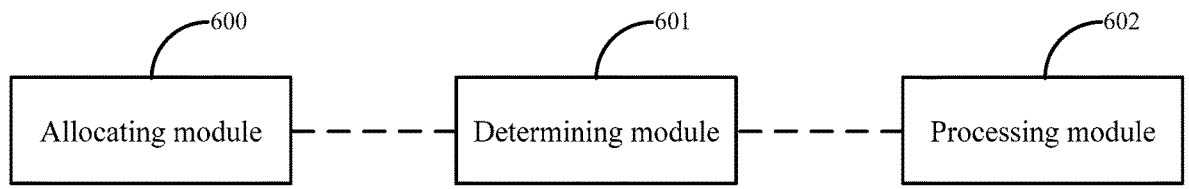
FIG. 6 is a schematic structural diagram of a system for transmitting data according to an embodiment of the application.

As illustrated in FIG. 6, a system for transmitting data according to an embodiment of the application includes: an allocating module 600 is configured to compose RLC PDUs from received PDCP PDUs, and to allocate corresponding RLC SNs for the composed RLC PDUs, where each RLC PDU corresponds to one RLC SN, and each RLC PDU includes at least one PDCP PDU; a determining module 601 is configured to determine data corresponding to a scheduled resource from the composed RLC PDUs according to the size of the scheduled resource; and a processing module 602 is configured to compose MAC PDUs from the data corresponding to the scheduled resource, and to transmit the MAC PDUs.

Optionally the allocating module 600 is configured: to allocate corresponding RLC SNs in the order in which respective PDCP PDUs at the same priority are received.

Optionally the allocating module 600 is configured: to allocate RLC SNs preferentially for RLC PDUs composed from PDCP PDUs at a high priority.

Optionally each composed RLC PDU includes at least one of the received PDCP PDUs, and an RLC SN allocated for the composed RLC PDU; or if the order of PDCP SNs of the respective received PDCP PDUs is the same as the order of the allocated RLC SNs for the composed RLC PDUs, then each composed RLC PDU will include at least one of the received PDCP PDUs.

Optionally the allocating module 600 is configured: to compose the composed RLC PDUs from the received PDCP PDUs before the size of the scheduled resource is determined; or to compose the composed RLC PDUs from the received PDCP PDUs after the size of the scheduled resource is determined.

Optionally the determining module 601 is configured: if it is determined according to the size of the scheduled resource that segmentation is to be performed, to determine a target RLC PDU to be segmented, according to the size of the scheduled resource, and to segment the target RLC PDU to generate a new RLC PDU.

Optionally the determining module 601 is configured: to generate the new RLC PDU according to segmentation information and data segmented from the target RLC PDU; where the segmentation information includes a part or all of the following information: an RLC SN of the target RLC PDU; start positional information of the data segmented from the target RLC PDU in the target RLC PDU; length information of the data segmented from the target RLC PDU; or an indicator indicating whether the data segmented from the target RLC PDU is the last data segment in the target RLC PDU.

Optionally the processing module 602 is configured: to order RLC PDUs of the same logical channel according to their RLC SNs, and to order RLC PDUs of different logical channels according to their priorities; and to compose the MAC PDUs from the ordered RLC PDUs.

Optionally the processing module 602 is configured: to compose the MACP PDUs according to the LCIDs of the ordered RLC PDUs; where a MAC PDU comprises LCIDs of the respective RLC PDUs comprised in the MAC PDU; or a MAC PDU comprises different LCIDs, and there is a common LCID for RLC PDUs corresponding to the same LCID.

Optionally each RLC PDU is an initially transmitted RLC PDUs, and/or a retransmitted RLC PDU.

Optionally the allocating module 600, the determining module 601, and the processing module 602 are located in the same entity; or two modules among the allocating module 600, the determining module 601, and the processing module 602 are located in the same entity; or the allocating module 600, the determining module 601, and the processing module 602 are located in different entities.

Optionally if the allocating module 600, the determining module 601, and the processing module 602 are located in the same entity, then the entity will be an eNB or a UE or a DU; or if two modules among the allocating module 600, the determining module 601, and the processing module 602 are located in the same entity, then the allocating module 600 will be located in a CU, and the determining module 601 and the processing module 602 will be located in a DU.

Based upon the same inventive idea, an embodiment of the application further provides a system for receiving data, and since the system addresses the problem under a similar principle to the method for receiving data according to the embodiment of the application, reference can be made to the implementation of the method for an implementation of the system, and a repeated description thereof will be omitted here.

Figure 7:
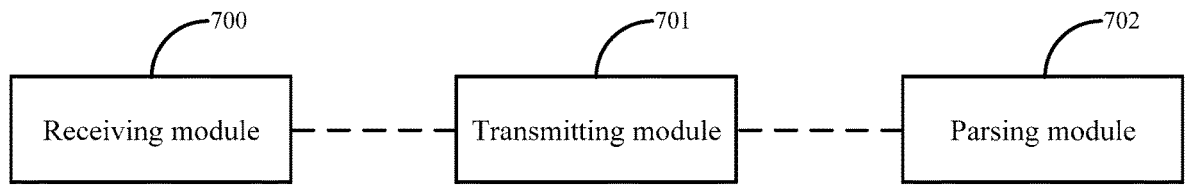
FIG. 7 is a schematic structural diagram of a system for receiving data according to an embodiment of the application.

As illustrated in FIG. 7, a system for receiving data according to an embodiment of the application includes: a receiving module 700 is configured to separate a received MAC PDU into a plurality of RLC PDUs; a transmitting module 701 is configured to transmit received RLC PDUs to a parsing module; and the parsing module 702 is configured to parse ordered and/or recombined RLC PDUs for PDCP PDUs upon determining that the RLC PDUs can be parsed, where each RLC PDU corresponds to one RLC SN, and each RLC PDU includes at least one PDCP PDU.

Optionally the parsing module 702 is further configured: to generate feedback information according to RLC SNs of the received RLC PDUs; where if there is a lost RLC PDU which is not segmented, then the feedback information will include the RLC SN of the lost RLC PDU; or if there is a lost RLC PDU segment, then the feedback information will include an RLC SN of the original RLC PDU including the lost RLC PDU segment, information indicating the start position of the lost RLC PDU segment in the original RLC PDU, and length information of the lost RLC PDU segment; or if there are consecutive RLC PDUs which are lost, and there is no segmented RLC PDU among the consecutive RLC PDUs, then the feedback information will include the RLC SN of the first RLC PDU among the consecutive RLC PDUs, and the number of lost RLC PDUs; or if there are consecutive RLC PDUs which are lost, and there is a segmented RLC PDU among the consecutive RLC PDUs, then the feedback information will include the RLC SN of the first RLC PDU among the consecutive RLC PDUs, information indicating the segmented RLC PDU, and the number of lost RLC PDUs, where the segmented RLC PDU is the first RLC PDU and/or the last RLC PDU among the consecutive RLC PDUs.

Optionally the transmitting module 701 is configured: to transmit the received RLC PDUs directly to the parsing module; or to order and/or recombine the received RLC PDUs according to RLC SNs of the received RLC PDUs, and then transmit the ordered and/or recombined RLC PDUs to the parsing module.

Optionally the receiving module 700, the transmitting module 701, and the parsing module 702 are located in the same entity; or two modules among the receiving module 700, the transmitting module 701, and the parsing module 702 are located in the same entity; or the receiving module 700, the transmitting module 701, and the parsing module 702 are located in different entities.

Optionally if the receiving module 700, the transmitting module 701, and the parsing module 702 are located in the same entity, then the entity will be an eNB or a UE or a DU; or if two modules among the receiving module 700, the transmitting module 701, and the parsing module 702 are located in the same entity, then the parsing module 702 will be located in a CU, and the receiving module 700 and the transmitting module 701 will be located in a DU.

Figure 8:
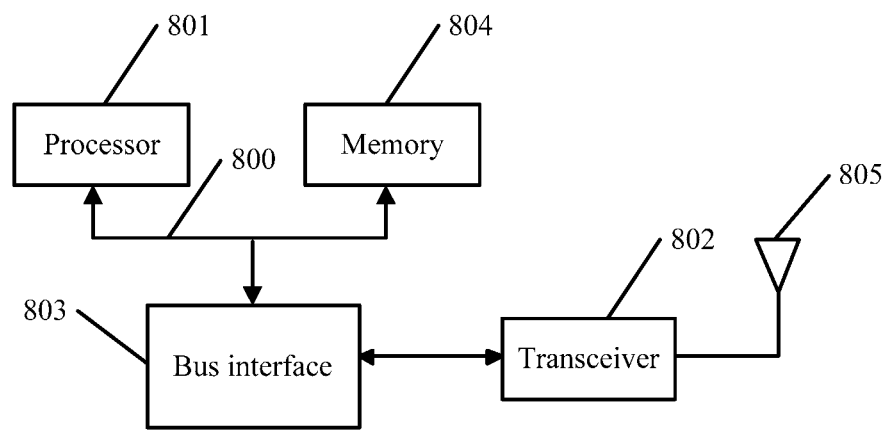
FIG. 8 is a schematic structural diagram of a transmitting device according to an embodiment of the application.

FIG. 8 illustrates an example in which the allocating module 600, the determining module 601, and the processing module 602 are located in the same entity, and structures in which two modules among the allocating module 600, the determining module 601, and the processing module 602 are located in the same entity or different entities will be similar to the structure as illustrated in FIG. 8 except that a processor performs the function or functions of one or more of the modules, so a repeated description thereof will be omitted here.

Based upon the same idea, an embodiment of the application further provides a transmitting device, and since the device addresses the problem under a similar principle to the method for transmitting data according to the embodiment of the application, reference can be made to the implementation of the method for an implementation of the device, and a repeated description thereof will be omitted here.

As illustrated in FIG. 8, a transmitting device according to an embodiment of the application includes: a processor 801 is configured to read and execute program in a memory 804: to compose RLC PDUs from received PDCP PDUs, and to allocate corresponding RLC SNs for the composed RLC PDUs, where each RLC PDU corresponds to one RLC SN, and each RLC PDU includes at least one PDCP PDU; to determine data corresponding to a scheduled resource from the composed RLC PDUs according to the size of the scheduled resource; and to compose MAC PDUs from the data corresponding to the scheduled resource, and to transmit the MAC PDUs.

A transceiver 802 is configured to receive and transmit data under the control of the processor 801.

Optionally the processor 801 is configured: to allocate corresponding RLC SNs in the order in which respective PDCP PDUs at the same priority are received.

Optionally the processor 801 is configured: to allocate RLC SNs preferentially for RLC PDUs composed from PDCP PDUs at a high priority.

Optionally each composed RLC PDU includes at least one of the received PDCP PDUs, and an RLC SN allocated for the composed RLC PDU; or if the order of PDCP SNs of the respective received PDCP PDUs is the same as the order of the allocated RLC SNs for the composed RLC PDUs, then each composed RLC PDU will include at least one of the received PDCP PDUs.

Optionally the processor 801 is configured: to compose the composed RLC PDUs from the received PDCP PDUs before the size of the scheduled resource is determined; or to compose the composed RLC PDUs from the received PDCP PDUs after the size of the scheduled resource is determined.

Optionally the processor 801 is configured: if it is determined according to the size of the scheduled resource that segmentation is to be performed, to determine a target RLC PDU to be segmented, according to the size of the scheduled resource, and to segment the target RLC PDU to generate a new RLC PDU.

Optionally the processor 801 is configured: to generate the new RLC PDU according to segmentation information and data segmented from the target RLC PDU; where the segmentation information includes a part or all of the following information: an RLC SN of the target RLC PDU; start positional information of the data segmented from the target RLC PDU in the target RLC PDU; length information of the data segmented from the target RLC PDU; or an indicator indicating whether the data segmented from the target RLC PDU is the last data segment in the target RLC PDU.

Optionally the processor 801 is configured: to order RLC PDUs of the same logical channel according to their RLC SNs, and to order RLC PDUs of different logical channels according to their priorities; and to compose the MAC PDUs from the ordered RLC PDUs.

Optionally the processor 801 is configured: to compose the MACP PDUs according to the LCIDs of the ordered RLC PDUs; where a MAC PDU comprises LCIDs of the respective RLC PDUs comprised in the MAC PDU; or a MAC PDU comprises different LCIDs, and there is a common LCID for RLC PDUs corresponding to the same LCID.

Optionally each RLC PDU is an initially transmitted RLC PDUs, and/or a retransmitted RLC PDU.

In FIG. 8, the bus architecture (represented by the bus 800) can include any number of interconnecting buses and bridges to particularly link together various circuits including one or more processors represented by the processor 801, and one or more memories represented by the memory 804. The bus 800 can further link together various other circuits, e.g., a peripheral device, a manostat, a power management circuit, etc., all of which are well known in the art, so a further description thereof will be omitted in this context. The bus interface 803 serves an interface between the bus 800 and the transceiver 802. The transceiver 802 can be an element, or a number of elements, e.g., a number of transmitters and receivers, which are units for communication with various other devices over a transmission medium. Data processed by the processor 801 are transmitted over a radio medium through the antenna 805, and furthermore the antenna 805 receives data and transmits the data to the processor 801.

The processor 801 is responsible for managing the bus 800 and performing normal processes, and can further various functions including timing, a peripheral interface, voltage regulation, power source management, and other control functions, and the memory 804 can store data for use by the processor 801 in performing the operations.

Optionally the processor 801 can be a Central Processing Unit (CPU), an Application-Specific Integrated Circuit (ASIC), a Field-Programmable Gate Array (FPGA), or a Complex Programmable Logic Device (CPLD).

Based upon the same inventive idea, an embodiment of the application further provides a receiving device, and since the device addresses the problem under a similar principle to the method for receiving data according to the embodiment of the application, reference can be made to the implementation of the method for an implementation of the device, and a repeated description thereof will be omitted here.

Figure 9:
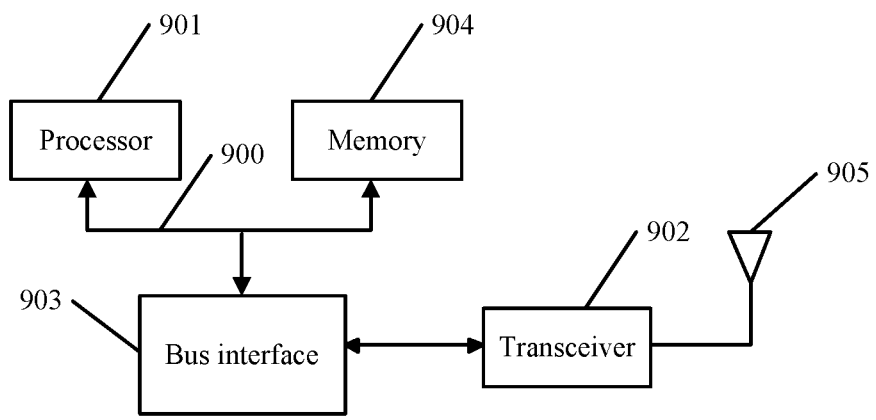
FIG. 9 is a schematic structural diagram of a receiving device according to an embodiment of the application.

FIG. 9 illustrates an example in which the receiving module 700, the transmitting module 701, and the parsing module 702 are located in the same entity, and structures in which two modules among the receiving module 700, the transmitting module 701, and the parsing module 702 are located in the same entity or different entities will be similar to the structure as illustrated in FIG. 9 except that a processor performs the function or functions of one or more of the modules, so a repeated description thereof will be omitted here.

As illustrated in FIG. 9, a receiving device according to an embodiment of the application includes: a processor 901 is configured to read and execute program in a memory 904: to separate a received MAC PDU into a plurality of RLC PDUs; to transmit received RLC PDUs to a parsing module; and to parse ordered and/or recombined RLC PDUs for PDCP PDUs upon determining that the RLC PDUs can be parsed, where each RLC PDU corresponds to one RLC SN, and each RLC PDU includes at least one PDCP PDU.

A transceiver 902 is configured to receive and transmit data under the control of the processor 901.

Optionally the processor 901 is further configured: to generate feedback information according to RLC SNs of the received RLC PDUs; where if there is a lost RLC PDU which is not segmented, then the feedback information will include the RLC SN of the lost RLC PDU; or if there is a lost RLC PDU segment, then the feedback information will include the RLC SN of the original RLC PDU including the lost RLC PDU segment, information indicating the start position of the lost RLC PDU segment in the original RLC PDU, and length information of the lost RLC PDU segment; or if there are consecutive RLC PDUs which are lost, and there is no segmented RLC PDU among the consecutive RLC PDUs, then the feedback information will include the RLC SN of the first RLC PDU among the consecutive RLC PDUs, and the number of lost RLC PDUs; or if there are consecutive RLC PDUs which are lost, and there is a segmented RLC PDU among the consecutive RLC PDUs, then the feedback information will include the RLC SN of the first RLC PDU among the consecutive RLC PDUs, information indicating the segmented RLC PDU, and the number of lost RLC PDUs, where the segmented RLC PDU is the first RLC PDU and/or the last RLC PDU among the consecutive RLC PDUs.

Optionally the processor 901 is configured: to transmit the received RLC PDUs directly to the parsing module; or to order and/or recombine the received RLC PDUs according to the RLC SNs of the received RLC PDUs, and then transmit the ordered and/or recombined RLC PDUs to the parsing module.

In FIG. 9, the bus architecture (represented by the bus 900) can include any number of interconnecting buses and bridges to particularly link together various circuits including one or more processors represented by the processor 901, and one or more memories represented by the memory 904. The bus 900 can further link together various other circuits, e.g., a peripheral device, a manostat, a power management circuit, etc., all of which are well known in the art, so a further description thereof will be omitted in this context. The bus interface 903 serves an interface between the bus 900 and the transceiver 902. The transceiver 902 can be an element, or a number of elements, e.g., a number of transmitters and receivers, which are units for communication with various other devices over a transmission medium. Data processed by the processor 901 are transmitted over a radio medium through the antenna 905, and furthermore the antenna 905 receives data and transmits the data to the processor 901.

The processor 901 is responsible for managing the bus 900 and performing normal processes, and can further various functions including timing, a peripheral interface, voltage regulation, power source management, and other control functions, and the memory 904 can store data for use by the processor 901 in performing the operations.

Optionally the processor 901 can be a CPU, an ASIC, an FPGA, or a CPLD.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly the application can be further embodied in hardware and/or software (including firmware, resident software, micro-codes, etc.). Still furthermore the application can be embodied in the form of a computer program product on a computer useable or readable storage medium, where the computer program product includes computer useable or readable program codes embodied in the medium to be used by or in connection with an instruction executing system. In the context of the application, the computer useable or readable medium can be any medium which can include, store, communicate, transmit, or transport program to be used by or in connection with an instruction executing system, apparatus or device.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for transmitting data, the method comprising:
composing Radio Link Control Protocol Data Units (RLC PDUs) from received Packet Data Convergence Protocol Data Units (PDCP PDUs), and allocating corresponding Radio Link Control Sequence Numbers (RLC SNs) for the composed RLC PDUs, wherein each RLC PDU corresponds to one RLC SN, and each RLC PDU comprises at least one PDCP PDU;

determining data corresponding to a scheduled resource from the composed RLC PDUs according to the size of the scheduled resource; and
composing Media Access Control Protocol Data Units (MAC PDUs) from the data corresponding to the scheduled resource, and transmitting the MAC PDUs;
wherein the allocating the corresponding RLC SNs for the composed RLC PDUs, comprises:
allocating RLC SNs preferentially for RLC PDUs composed from PDCP PDUs at a high priority, and allocating corresponding RLC SNs in the order in which respective PDCP PDUs at the same priority are received; or
allocating RLC SNs preferentially for RLC PDUs composed from PDCP PDUs at a high priority, and allocating corresponding RLC SNs in the order in which respective sets of PDCP PDUs at the same priority are received, wherein each set of PDCP PDUs comprises at least one PDCP PDU.

2. The method according to claim 1, wherein each composed RLC PDU comprises at least one of the received PDCP PDUs, and an RLC SN allocated for the composed RLC PDU; or
if the order of Packet Data Convergence Protocol Sequence Numbers (PDCP SNs) of the respective received PDCP PDUs is the same as the order of the allocated RLC SNs for the composed RLC PDUs, then each composed RLC PDU comprises at least one of the received PDCP PDUs.

3. The method according to claim 1, wherein the composing the composed RLC PDUs from the received PDCP PDUs comprises:
composing the composed RLC PDUs from the received PDCP PDUs before the size of the scheduled resource is determined; or
composing the composed RLC PDUs from the received PDCP PDUs after the size of the scheduled resource is determined.

4. The method according to claim 1, wherein the determining the data corresponding to the scheduled resource from the composed RLC PDUs according to the size of the scheduled resource comprises: if segmentation is determined, according to the size of the scheduled resource, to be performed, then determining a target RLC PDU to be segmented, according to the size of the scheduled resource, and segmenting the target RLC PDU to generate a new RLC PDU;
wherein the segmenting the target RLC PDU to generate the new RLC PDU comprises: generating the new RLC PDU according to segmentation information and data segmented from the target RLC PDU;
wherein the segmentation information comprises a part or all of the following information:
an RLC SN of the target RLC PDU;
start positional information of the data segmented from the target RLC PDU in the target RLC PDU;
length information of the data segmented from the target RLC PDU; or
an indicator indicating whether the data segmented from the target RLC PDU is the last data segment in the target RLC PDU.

5. The method according to claim 1, wherein the composing the MAC PDUs from the data corresponding to the scheduled data comprises: ordering RLC PDUs of the same logical channel according to their RLC SNs, and ordering RLC PDUs of different logical channels according to their priorities; and composing the MAC PDUs from the ordered RLC PDUs;
wherein composing the MAC PDUs from the ordered RLC PDUs comprises: composing the MACP PDUs according to Logical Channel IDs (LCIDs) of the ordered RLC PDUs;
wherein a MAC PDU comprises LCIDs of respective RLC PDUs comprised in the MAC PDU; or a MAC PDU comprises different LCIDs, and there is a common LCID for RLC PDUs corresponding to the same LCD.

6. The method according to claim 1, wherein each RLC PDU is an initially transmitted RLC PDU, or a retransmitted RLC PDU.

7. A transmitting device, comprising:
a processor configured to read and execute program in a memory:
to compose Radio Link Control Protocol Data Units (RLC PDUs) from received Packet Data Convergence Protocol Data Units (PDCP PDUs), and to allocate corresponding Radio Link Control Sequence Numbers (RLC SNs) for the composed RLC PDUs, wherein each RLC PDU corresponds to one RLC SN, and each RLC PDU comprises at least one PDCP PDU; to determine data corresponding to a scheduled resource from the composed RLC PDUs according to the size of the scheduled resource; and to compose Media Access Control Protocol Data Units (MAC PDUs) from the data corresponding to the scheduled resource, and to transmit the MAC PDUs;
a transceiver configured to receive and transmit data under the control of the processor;
wherein the processor is configured to:
allocate RLC SNs preferentially for RLC PDUs composed from PDCP PDUs at a high priority, and allocate corresponding RLC SNs in the order in which respective PDCP PDUs at the same priority are received; or
allocate RLC SNs preferentially for RLC PDUs composed from PDCP PDUs at a high priority, and allocate corresponding RLC SNs in the order in which respective sets of PDCP PDUs at the same priority are received, wherein each set of PDCP PDUs comprises at least one PDCP PDU.

8. The device according to claim 7, wherein each composed RLC PDU comprises at least one of the received PDCP PDUs, and an RLC SN allocated for the composed RLC PDU; or
if the order of Packet Data Convergence Protocol Sequence Numbers (PDCP SNs) of the respective received PDCP PDUs is the same as the order of the allocated RLC SNs for the composed RLC PDUs, then each composed RLC PDU comprises at least one of the received PDCP PDUs.

9. The device according to claim 7, wherein if the processor determines according to the size of the scheduled resource that segmentation is to be performed, then the processor is configured to determine a target RLC PDU to be segmented, according to the size of the scheduled resource, and segment the target RLC PDU to generate a new RLC PDU;
wherein the processor is further configured to generate the new RLC PDU according to segmentation information and data segmented from the target RLC PDU;
wherein the segmentation information comprises a part or all of the following information:

an RLC SN of the target RLC PDU;
start positional information of the data segmented from the target RLC PDU in the target RLC PDU;
length information of the data segmented from the target RLC PDU; or
an indicator indicating whether the data segmented from the target RLC PDU is the last data segment in the target RLC PDU.

10. The device according to claim 7, wherein the processor is configured to order RLC PDUs of the same logical channel according to their RLC SNs, and order RLC PDUs of different logical channels according to their priorities; and compose the MAC PDUs from the ordered RLC PDUs;
wherein the processor is further configured to: compose the MACP PDUs according to Logical Channel IDs (LCIDs) of the ordered RLC PDUs;
wherein a MAC PDU comprises LCIDs of respective RLC PDUs comprised in the MAC PDU; or a MAC PDU comprises different LCIDs, and there is a common LCID for RLC PDUs corresponding to the same LCD.

11. The device according to claim 7, wherein each RLC PDU is an initially transmitted RLC PDU, or a retransmitted RLC PDU.

* * * * *

UNITED STATES PATENT AND TRADEMARK OFFICE
CERTIFICATE OF CORRECTION

PATENT NO. : 10,986,653 B2
APPLICATION NO. : 16/346462
DATED : April 20, 2021
INVENTOR(S) : Jiamin Liu and Bertrand Pierre Page 1 of 1

It is certified that error appears in the above-identified patent and that said Letters Patent is hereby corrected as shown below:

On the Title Page

Item (22): Please delete "Nov. 10, 2017" and insert --October 11, 2017-- after "PCT Filed:".

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*